(12) United States Patent
Ding

(10) Patent No.: US 9,417,830 B2
(45) Date of Patent: Aug. 16, 2016

(54) NETWORK PRINTING SYSTEM AND PRINTING METHOD

(71) Applicant: Sitao Ding, Beijing (CN)

(72) Inventor: Sitao Ding, Beijing (CN)

( * ) Notice: Subject to any disclaimer, the term of this patent is extended or adjusted under 35 U.S.C. 154(b) by 0 days.

(21) Appl. No.: 14/703,826

(22) Filed: May 4, 2015

(65) Prior Publication Data

US 2015/0324153 A1    Nov. 12, 2015

(30) Foreign Application Priority Data

May 6, 2014  (CN) .......................... 2014 1 0187241

(51) Int. Cl.
*G06F 3/12*  (2006.01)

(52) U.S. Cl.
CPC .............. *G06F 3/126* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 7,502,133 B2* | 3/2009 | Fukunaga | ......... | G06F 17/30265 358/1.1 |
| 8,614,833 B2* | 12/2013 | Oda | ....................... | G06F 3/1204 235/435 |
| 8,867,070 B2* | 10/2014 | Jazayeri | ................ | G06F 3/1204 358/1.14 |
| 8,988,716 B1* | 3/2015 | Odean | ................... | G06F 3/1238 358/1.14 |
| 9,001,389 B2* | 4/2015 | Kamijoh | .............. | B42D 25/485 358/1.6 |
| 2002/0131071 A1* | 9/2002 | Parry | ................ | G06F 17/30879 358/1.15 |
| 2005/0162699 A1* | 7/2005 | Fukunaga | .......... | H04N 1/00132 358/1.18 |
| 2005/0274804 A1* | 12/2005 | Matsumoto | ............ | G06K 1/121 235/462.01 |
| 2011/0011926 A1* | 1/2011 | Matsumoto | ............ | G06K 1/121 235/375 |
| 2012/0309372 A1* | 12/2012 | Kamijoh | .............. | B42D 25/485 455/414.2 |
| 2015/0002870 A1* | 1/2015 | Burke, Jr. | .............. | G06F 3/1204 358/1.13 |

* cited by examiner

*Primary Examiner* — Dung Tran
(74) *Attorney, Agent, or Firm* — Syncoda LLC; Feng Ma; Junjie Feng

(57) ABSTRACT

A network print server includes: a print task memory configured to store a print task list; a printing device registration unit configured to establish, in response to a request of a printing device, a network connection to the printing device, register the printing device and create in the print task memory a print task list corresponding to the printing device; a print task management unit configured to receive a print request from a computing device and add a print task entry in the print task list of the requested printing device, the print task entry comprising a print task ID and print task content; and a two-dimensional code encoding unit. The present invention discloses also a network printing device and the corresponding printing method and system.

12 Claims, 5 Drawing Sheets

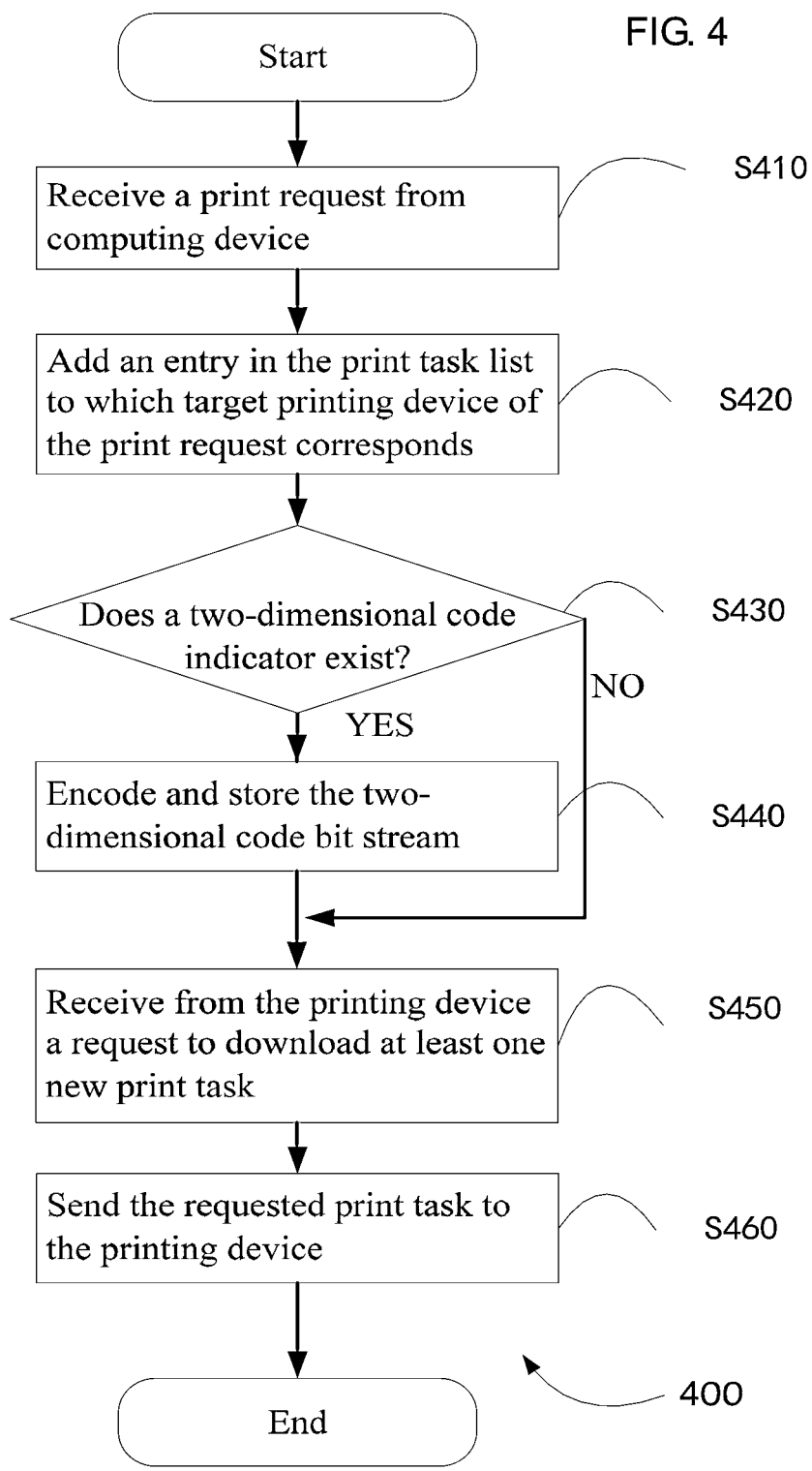

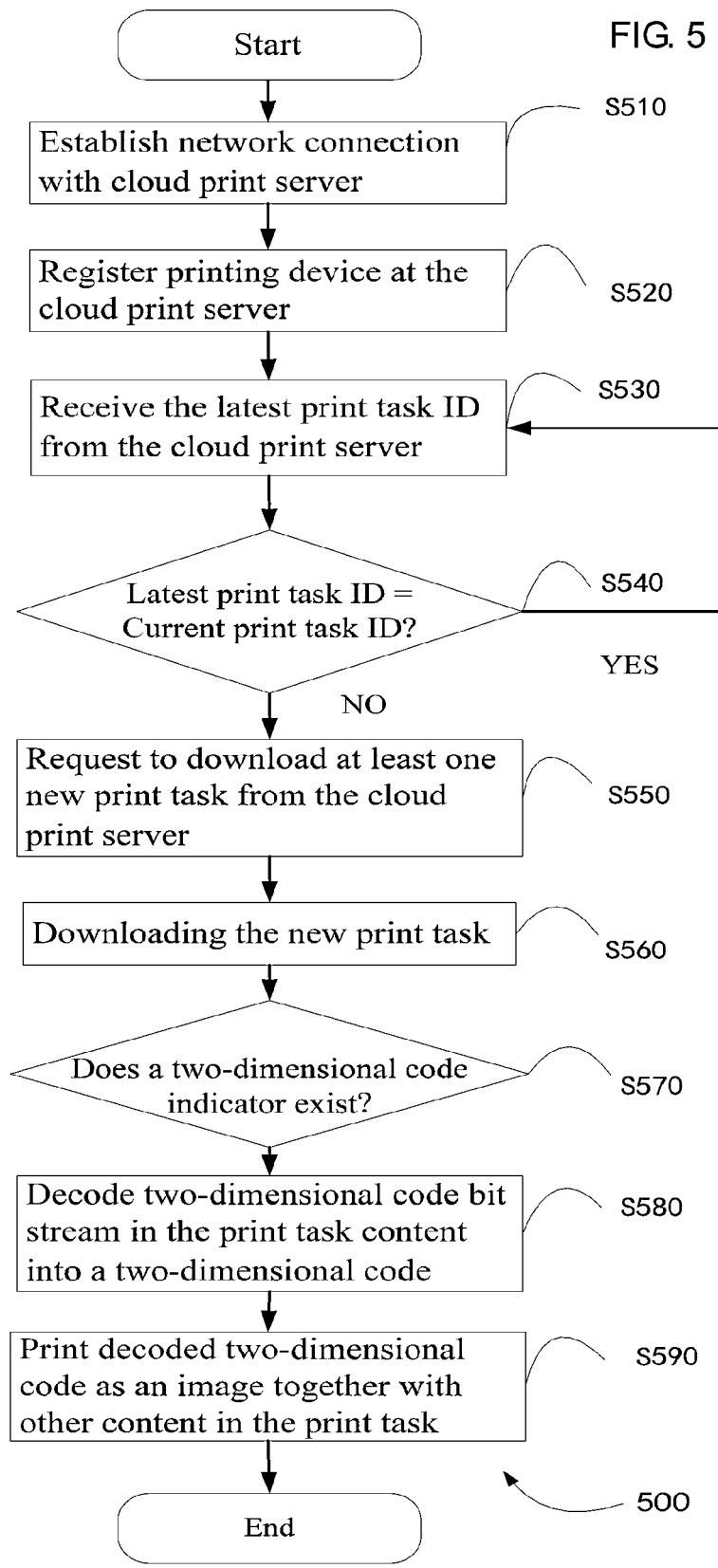

NETWORK PRINTING SYSTEM AND PRINTING METHOD

CROSS-REFERENCE TO RELATED APPLICATIONS

The present application is a continuation of, and claims priority to, Chinese Patent Application No. CN 201410187241.1 filed May 6, 2014, the disclosure of which is hereby incorporated by reference in its entirety.

BACKGROUND

Printer is a commonly seen device in an office environment, which is mainly used to print computer-processed results on a related medium. Currently network printing inside a local network becomes ordinary, and some organizations, e.g., corporations and schools, even arrange a dedicated printer server enabling a user to install a client drive program of a printer on his/her computer and thus print files (e.g., photos, documents, etc.) in the computer on a printer managed by the printer server. Since the computer, the printer and the printer server are all situated within the local network, which forms a closed system for the organizations, it is easy to perform the security management and the printing for the print tasks.

However, a print user may also be located outside a local network in many circumstances. For instance, when a user on a business trip browses emails on a portable computing device such as a laptop computer, a smart phone, or a tablet computer, he/she may hope to print the content of the emails on a printer of the hotel where he/she stays. The user may add the device to the local network of the hotel to connect with the printer and install a corresponding printer driver to print the emails. Apparently, this is not convenient because the hotel may not be willing to open its local network to the public, and may also require complicated set-ups even if adding to the local network is allowed for users. Moreover, it often takes time and efforts to seek and install the driver for a certain printer model. In particular when the user uses a mobile terminal like a smart phone, possibly no corresponding driver(s) has/have been developed for such mobile terminals. Nowadays, with the rapid development of mobile internet techniques, the user expects a more flexible and efficient printing implementation, rather than that of the traditional local networks.

At present there have been approaches of providing printing service via the Internet, e.g., cloud printing. A printer server for controlling the printer is provided, and then an IP address that may be accessed over the Internet is assigned to the printer server, such that the user can send via the Internet the content to be printed directly to the printer server which in turn controls the printer to perform printing. Nevertheless, such cloud printing technique requires the corporation to buy a dedicated printer supporting the cloud printing function, whereas the various types of traditional printers widely applied presently cannot be utilized, which would no doubt increase many extra expenses for the corporation.

Furthermore, two-dimensional codes are widely used currently, for example, the user may acquire related information or download a related application via a two-dimensional code. Therefore, in many circumstances, it may be necessary to print the two-dimensional codes for the user to scan and acquire information. However, among the existing cloud printing techniques, the two-dimensional codes are only transmitted as images, and when the network connection is somewhat in a poor condition, this may give rise to such problems as a longer print delay.

So there is a need for a network printing technique which is compatible with an existing printer and/or improve the two-dimensional code printing.

SUMMARY

The present invention relates to network printing techniques, especially to a network printing system and printing method.

To this end, the present invention provides a new network printing device, a network printing system and a corresponding printing method, in an attempt to solve or at least alleviate the problems above.

According to one aspect of the present invention, a network print server is provided, comprising: a print task memory configured to store a print task list; a printing device registration unit configured to establish, in response to a request of a printing device, a network connection to the printing device, register the printing device and create in the print task memory a print task list corresponding to the printing device; and a print task management unit configured to receive a print request from a computing device and add a print task entry in the print task list of the requested printing device, the print task entry comprising a print task ID and print task content; and a two-dimensional code encoding unit. The print task management unit is further configured to determine whether an indicator exists in the print request indicative of the print content comprising a two-dimensional code, and if so, the two-dimensional code encoding unit is configured to encode a URL intended to be converted to a two-dimensional code into a two-dimensional code bit stream and store it as part of the print task.

The print task management unit is further configured to receive from the printing device a request to download at least one new print task, and send the requested print task to the printing device, the at least one new print task corresponding to at least one print task ID subsequent to the current print task ID maintained in the printing device. The content of the print task may be encrypted by a key. The URL may be provided by the computing device or pre-stored in the network print server.

According to a further aspect of the present invention, a network printing device is provided, comprising: a network initialization unit configured to establish a network connection between the printing device and the network print server and register the printing device at the network print server; a print task management unit configured to compare the latest print task ID of the printing device provided by the network print server with the current print task ID maintained in the printing device, and request and download at least one new print task from the network print server if the two print task IDs are inconsistent, the at least one new print task corresponding to at least one print task ID subsequent to the current print task ID maintained in the printing device; and a two-dimensional code decoding unit. The print task management unit is further configured to determine whether an indicator exists in the print request indicative of the print content comprising a two-dimensional code, and if so, the two-dimensional code decoding unit is configured to decode the two-dimensional code bit stream in the print task into a two-dimensional code.

The network printing device may further comprise a printing unit configured to execute a print task assigned by the print task management unit, wherein the decoded two-dimensional code is printed as a picture together with other contents in the print task. The network initialization unit, the print task management unit and the two-dimensional code decoding unit may be located in a printing box outside of the printing unit.

The network printing device may further comprise a decryption unit for decrypting the print task content encrypted by a key.

According to a further aspect of the present invention, a printing method of a network print server is provided, comprising: receiving a print request from a computing device; adding a print task entry in the print task list to which the target printing device of the print request corresponds, the print task entry comprising a print task ID and print task content; receiving from the printing device a request to download the print task; determining whether an indicator exists in the print request indicative of the print content comprising a two-dimensional code; if so, encoding a URL intended to be converted to a two-dimensional code into a two-dimensional code bit stream and storing it as part of the print task.

The method may further comprise receiving from the printing device a request to download at least one new print task, sending the requested print task to the printing device, the at least one new print task corresponding to at least one print task ID subsequent to the current print task ID maintained in the printing device. The print task content may be encrypted by a key. The URL may be provided by the computing device or pre-stored in the network print server.

According to a further aspect of the present invention, a printing method of a network printing device is provided, comprising: establishing a connection to the network print server; registering the printing device at the network print server; receiving from the network print server the latest print task ID in the print task list; comparing the latest print task ID with the current print task ID maintained in the printing device; and requesting to download at least one new print task from the network print server if the two print task IDs are inconsistent, the at least one new print task corresponding to at least one print task ID subsequent to the current print task ID maintained in the printing device; downloading the new print task; determining whether an indicator exists in the print task indicative of the print content comprising a two-dimensional code; if so, decoding the two-dimensional code bit stream in the print task content into a two-dimensional code.

The method may further comprise printing the decoded two-dimensional code as an image together with other contents in the print task. The method may further comprise decrypting the print task content encrypted by a key.

According to a further aspect of the present invention, a network printing system comprising the above network print server and at least one above network printing device is provided.

In light of the network printing method according to the present invention, since a two-dimensional code is transmitted to the printing device by virtue of a bit stream instead of an image, the amount of data to be transmitted is saved considerably, which is critical for the situation where the printing device is connected to the network server over a low-speed network such as a cellular network or a network that charges by the traffic. Moreover, for the URL requested by the computing device, a corresponding two-dimensional code bit stream is generated by the network print server, instead of the computing device, and as a result, the amount of data to be transmitted between the computing device and the cloud print server is saved considerably as well, and so are the limited computing resources and batteries of the computing device. In addition, for a traditional printer, it needs only to connect a network printing box externally to become a network printer, such that the existing printing device is utilized to an utmost extent, which is cost-saving.

BRIEF DESCRIPTION OF THE DRAWINGS

To the accomplishment of the foregoing and related ends, certain illustrative aspects are described herein in combination with the following description and the annexed drawings. These aspects are indicative of the various ways in which the principles disclosed herein can be practiced and all aspects and equivalents thereof are intended to be within the scope of the claimed subject matter. The foregoing and other goals, features and advantages of this disclosure will become more apparent from the following detailed description in conjunction with the drawings. Throughout this disclosure, the same reference signs usually refer to the same parts or elements.

FIG. 4 illustrates a flow chart of a printing method 400 executed by a cloud print server according to an exemplary embodiment of the present invention;

FIG. 5 illustrates a flow chart of a printing method 500 executed by a printing device according to an exemplary embodiment of the present invention.

DETAILED DESCRIPTION

Figure 1:
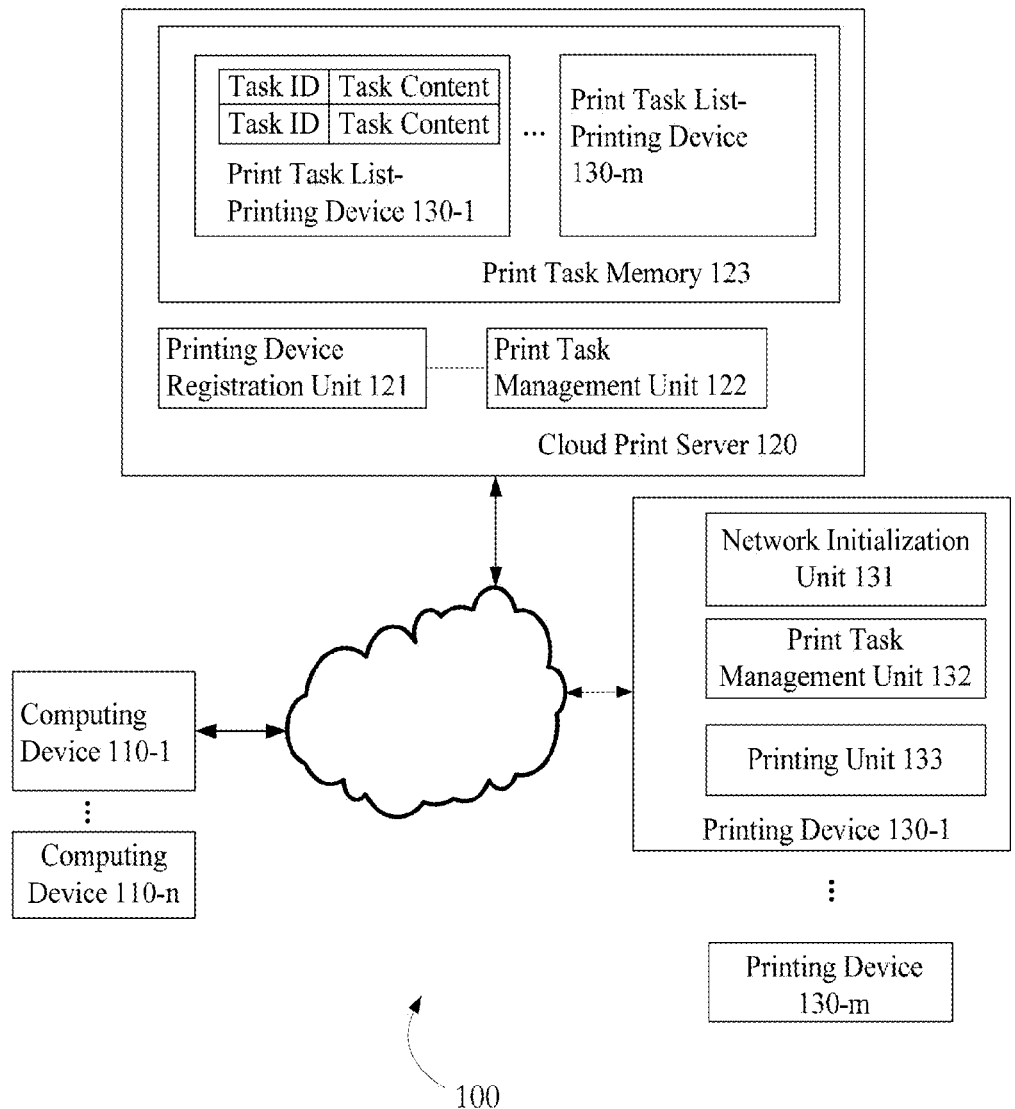
FIG. 1 illustrates a schematic view of a cloud printing system 100 according to one embodiment of the present invention.

The exemplary embodiments of this disclosure will be described in a more detailed manner as follows with reference to the drawings. Although the exemplary embodiments of this disclosure are shown in the drawings, it should be understood that this disclosure can be implemented in various forms and should not be restricted by the embodiments described herein. On the contrary, these embodiments are provided to make this disclosure more thoroughly understood and the scope of the disclosure fully conveyed to those of skill in the art.

FIG. 1 illustrates a schematic view of a cloud printing system 100 according to an exemplary embodiment of the present invention. As shown in FIG. 1, the cloud printing system 100 comprises one or more computing devices 110-1, 110-2, . . . , 110-n (hereinafter referred to as 110 for the convenience of description) that serve as a cloud print client, a cloud print server 120, one or more printing devices 130-1, 130-2, . . . , 130-m (hereinafter referred to as 130 for the convenience of description). It should be noted that the concept of cloud printing herein is described as an example. In fact, the present invention can be applied to network print servers and printing devices capable of connecting to a network beyond a local network, where different terms or concepts may be used.

The computing device 110 may include a desktop computer, a laptop computer, a smart phone, a tablet computer, etc., and use operation systems such as Windows®, IOS® and Android®. On each computing device 110 an application 111 that supports cloud printing functions is installed. The application 111, for example, may be an APP or a web browser, a word processing software and such like running on the operation system. The computing device 110 has access to the cloud print server 120 via a public network based on various types of communication mechanisms, e.g. in all suitable communications such as Ethernet, Wifi and mobile cellular network.

The cloud print server 120 may represent a plurality of servers or a single server. The cloud print server 120 comprises a printing device registration unit 121, a print task management unit 122 and a print task memory 123. The printing device registration unit 121 may establish, in response to a request from the printing device 130, an initial network connection with the printing device 130, register the printing device 130, and create a print task list corresponding to the printing device 130 in the print task memory 123. For each registered printing device 130, the print task management unit 122 maintains in the print task memory 121 a print task list corresponding to the printing device 130. Each entry in the print task list may comprise a print task ID and print task content. The print task management unit 122 receives a print request from the computing device 110 and creates a new print task entry in the print task list of the requested printing device 130. When there is a new print task for the printing device 130, the print task management unit 122 may initiatively push the print task ID to the printing device 130, so that the printing device 130 may download the print task and print the same. Alternatively, the print task management unit 122 may also return, in response to a request from the printing device 130 for an inquiry of the print task ID, the latest print task ID to the printing device 130, such that the printing device 130 may download the print task and print the same.

Although the print task memory 121 is shown as an entity part of the cloud print server 120, it should be understood that it may represent a cloud memory device composed of a large number of entity storage distributed in different physical locations. In practice, the cloud print system may be implemented by an architecture including a cloud print server/cloud computing center, local thin server (embedded system local server) and printer/cluster of printers. The cluster of printers may include one or more printers using Epson instruction sets.

The printing device 130 comprises a network initialization unit 131, a print task management unit 132 and a printing unit 133. The network initialization unit 131 may establish a network connection between the printing device 130 and the cloud print server 120 such that the printing device 130 has a corresponding IP address for subsequent secure communication. The printing device 130 may get access to a public network and connect to the cloud print server either via a wired and wireless local network inside of a corporation or a business, or via a 3G or 4G cellular network, etc. During this process, the network initialization unit 131 further registers the printing device 130 at the cloud print server 120 so as for the cloud print server 120 to create and maintain a print task list corresponding to the printing device 130. The print task management unit 132 may comprise a web server for receiving the print task ID pushed by the cloud print server 120 and determine whether a new print task exists. Alternatively, the web server may further inquire of, e.g., by polling, the cloud print server 120 periodically about the print task ID. If it is determined that a new print task exists, the print task management unit 132 will download the new print task from the cloud print server 120 and perform the printing by means of the printing unit 133.

In order to utilize existing traditional printers, according to the conception of the present invention, a traditional printer can be equipped further with an extension device with cloud printing function, e.g., a cloud printing box. For the latter, the cloud printing box may comprise a network initialization unit 131 and a print task management unit 132, while the traditional printer serves as a printing unit 133. The cloud printing box has a driver for the traditional printer installed therein and is connected with the traditional printer by e.g. a Universal Serial Bus (USB). In this way, the corporation or business does not have to buy a new cloud printer but needs only to connect a cloud printing box externally to a traditional printer to turn it into a cloud printer, such that the existing printing device is utilized to an utmost extent, which is cost-saving. In a further embodiment, a printing box may be connected to a plurality of traditional printers and hence the cost is further saved.

In addition, the present invention proposes a printing method of a two-dimensional code.

A two-dimensional code records information about data symbols with certain specific black-and-white geometrical figures distributed on a plane (in a two-dimensional direction) according to certain rules. The two-dimensional codes in common use include: Data Matrix, Maxi Code, Aztec, QR Code, Vericode, PDF417, Ultracode, Code 49, Code 16K, etc., among which QR (Quick-Response) Code, i.e., QR code, is most popular. The QR code has the advantage of fast decoding, and may store information of different types. The specifications of QR code can be found on the internet. In order to process the two-dimensional code, the cloud print server 120 may further comprise a two-dimensional code encoding unit, and the printing device 130 may further comprise a two-dimensional code decoding unit.

The two-dimensional code printing process is introduced as follows by example of an ordering application using the QR code.

Figure 2:
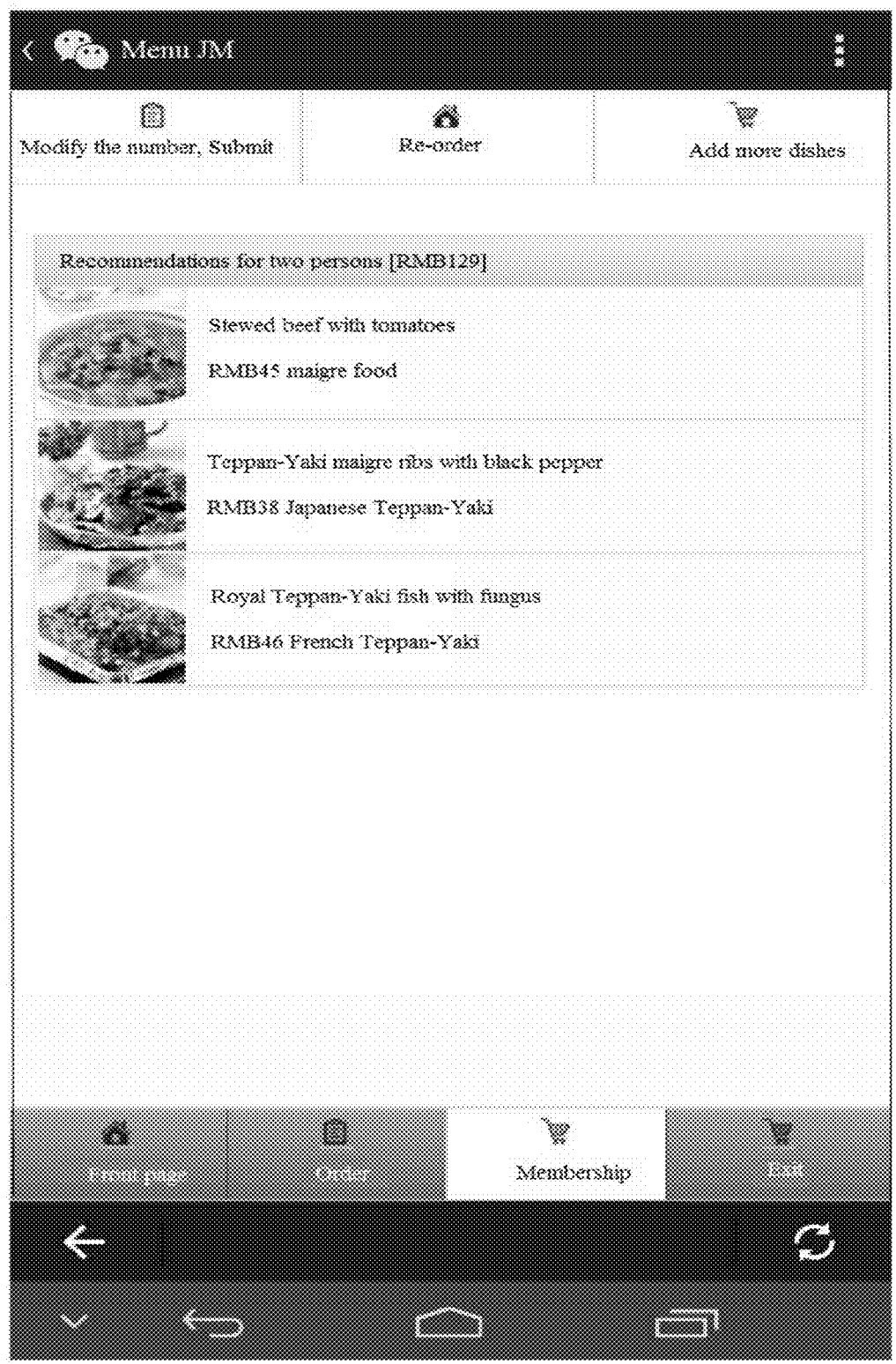
FIG. 2 illustrates a schematic view of a client interface of an order online application.

FIG. 2 illustrates a schematic view of a client interface of an online ordering application.

With the prevalence of smart mobile terminals, the user can conveniently download the online ordering application client on a smart phone 110, e.g., from an application store. The online ordering application client communicates with an application server which may be a server identical to or different from the cloud print server 120. The user may carry out a variety of operations on an interface displayed in the application, e.g., browsing menus offered by the business, selecting the desired dishes, then inputting the user information (e.g., telephone number, takeout address, payment method, etc.) and submitting the order. This process may comprise the user's registration process, and the user's account information (e.g., telephone number) may be shared between the application server and the cloud print server 120. When confirming the order, the online ordering application client may read the telephone number of the user from the smart phone and acquired his/her geographical position via GPS and/or the cellular network to thus reduce the user's input and improve the user's experience. When the user submits an order, the application client sends a request to the application server, while the application client and/or the application server send(s) also a print request to the associated cloud print server 120.

It should be noted that there may be more than one print request sent by the application client and/or the application server. For instance, for the above online ordering application, when the user submits an order, it is often necessary to print a triplicate copy, i.e., the reception copy, the client copy and the kitchen copy. The contents of the triplicate can be either as a whole presented in one print request and printed as one print task, or respectively presented in three consecutive print requests and printed as three consecutive print tasks. The following example shows the format of a print request of the kitchen copy.

The print request may comprise information such as the user ID, the business ID, the print content, etc. The print request format of the kitchen copy is exemplified as follows.

```
        id: 75
            torder_id: 29
        partner_id: 80001250
            table_id: 797877
                content:
BC!-BC! kitchen copy -- 136
CC!-CC!======80001250======
Print time 2014-04-09 18:11:46
Table No. 797877                      order 29 customer service
------------------------
        Entree                 Olio Noodle with Tomato Sauce
                  standard
        Wheaten Food           Chongqing Spicy Chicken
                  standard
        Wheaten Food           Royal Sautéed Lamb Slices
                  standard
------------------------
has_qrcode: 0
                  printed: 0
     printer_id: 136
create_time: 1397038306
modify_time: 0
```

The cloud print server 120 may store a mapping table between the business ID and the printing device 130. Alternatively, the mapping table may also be stored in the application server, and then forwarded by the application server to the cloud print server for the latter to inquire about the corresponding printing device of the print request. Alternatively, the application server may translate the business ID in the print request into an ID of the corresponding printing device 130 according to the mapping table. In this case, the print request sent to the cloud print server 120 has already included the ID of the printing device 130. To sum up, the cloud print server 120 may learn about the printing device 130 that corresponds to a print request in different ways. Prior to that, e.g., when the printing device 130 starts up or is connected to the network, the printing device registration unit 121 of the cloud print server 120 has already established an initial network connection with the printing device 130 in response to a request from the printing device 130, verified/registered the printing device 130 and created in the print task memory 123 a print task list corresponding to the printing device 130. The IP address of the printing device 130 is stored in the cloud print server 120. If no connection to or no registration of the target printing device 130 is established, the cloud print server 120 may notify the target printing device 130 to connect to the network for registration in various ways, e.g., by sending GSM messages to the business, or may select an alternative printing device upon strategies. When the cloud print server 120 receives the print request directed to the target printing device 130, the print task management unit 122 adds an entry in the print task list corresponding to the target printing device 130. Apart from e.g. the print task content as shown above, the entry may further comprise a print task ID. The print task ID may be an integer increasing one by one to uniquely identify a print task. The entry may further comprise other identification fields, e.g., has_qrcode: 0 means that the print content does not contain a QR code, while has_qrcode: 1 means that the print content contains QR code(s). The field printed: 0 means that the print content has not ever been printed; and the field create_time indicates that the print task will be performed after a certain time period.

When it is indicated that the print content comprises a QR code, the application transmits to the cloud print server a URL intended to be converted to a QR code, or the URL may be pre-stored in the cloud print server. The URL, for instance, corresponds to the download address or introduction information of the application. Upon receipt of a print request from the smart phone 110, the print task management unit 122 of the cloud print serer 120 adds a print task entry in the print task list of the requested printing device 130, the print task entry comprising a print task ID and print task content. When an indicator exists in the print request indicative of the print content comprising a two-dimensional code (e.g., QR code), the two-dimensional code encoding unit encodes the related URL into a two-dimensional code bit stream and stores the two-dimensional code bit stream in the print task content. For example, the conversion may be carried out by using the open API of Google. A php example is given as follows.

```
<?php
  $urlToEncode= "Welcome to the Wilson of the House";
  generateQRfromGoogle($urlToEncode);
function generateQRfromGoogle($chl,$widhtHeight = '150'
  ,$EC_level= 'L',$margin='0'){
  $url = urlencode($url);
  echo '<img src=" http://chart.apis.google.com/chart?chs='
  .$widhtHeight.' x' .$widhtHeight.' &cht=qr&chld=' .$EC_level.'
  |' .$margin.' &chl=' .$chl.' " alt=" QR code" widhtHeight="'
  '.$size.' " widhtHeight=" '.$size.' " />';
  }
?>
```

The two dimensional code is stored in the cloud print server in the form of a bit stream. The algorithm for the conversion is known, for instance, after the encoding of a simple URL "01234567", the following return value is obtained:
"0110111111111011011011111111100000101010001000-
0011011101001101010111
0110111010110000101110110111010011000101110110-
0000100110001000000111
1111101010101111111000000000100000000000101101-
110010001001011000101
0110101001011001001011110001111100101101000100-
10110001010000111110
0101001000000000000111001010000111111110100001-
10101101000001010111111
100010110111010010100100000011011101010100100010-
110101110101011010
010010000100101101011011111111101001100100010".
It can be obtained from the return value that after the two-dimensional code information encoding, "01234567" should be understood as a square matrix with a width of 21 units and a height of 21 units, and a pixel color in respective positions of the two-dimensional code image may be generated according to each element value (0 or 1) in the matrix. If value 0 is defined as white and value 1 as black, and each unit corresponds to one pixel, the corresponding two-dimensional code image should be a black-and-white image with a width of 21 pixels and a height of 21 pixels.

In a cloud printing by "pull", the print task management unit 132 of the printing device 130 inquires of the cloud print server 120 periodically about the print task ID, e.g., by polling every n seconds. The print task management unit 122 feeds back the latest print task ID to the printing device 130 in response to the request for the inquiry about the print task ID. The print task management unit 132 compares the inquired print task ID with the current print task ID maintained in the printing device 130, and if the two print task IDs are found inconsistent, requests to download from the cloud print server 120 new print task(s) between the two print task IDs, i.e. print task(s) subsequent to the current print task ID. In a cloud printing by "push", the print task management unit 122 of the cloud print server 120 pushes a respective print task ID to a printing device 130 periodically or e.g. when a new print task entry is added. The print task management unit 132 of the printing device 130 compares the received print task ID with the current print task ID maintained in the printing device 130, and requests to download from the cloud print server 120 the new print task(s) subsequent to the current print task ID if the two print task IDs are found inconsistent.

After the printing device 130 has downloaded the print task, the print task management unit 132 of the printing device 130 determines whether an indicator exists in the print task indicative of the print content comprising a two-dimensional code (e.g., QR code). When the indicator comprising a two-dimensional code exists, the two-dimensional code decoding unit decodes the two-dimensional code bit stream in the print task into a two-dimensional code, and the printing unit 133 prints the decoded two-dimensional code as an image together with other content in the print task. Since the two-dimensional code is transmitted to the printing device by virtue of a bit stream instead of an image, the amount of data to be transmitted is saved considerably, which is critical for the situation where the printing device is connected to the network server over a low-speed network such as a cellular network or a network that charges by the traffic. Moreover, for the URL requested by the computing device, a corresponding two-dimensional code bit stream is generated by the network print server, instead of the computing device, and as a result, the amount of data to be transmitted between the computing device and the cloud print server is saved considerably as well, and so are the limited computing resources and battery of the computing device.

Figure 3:
FIG. 3 illustrates an example of a two-dimensional code.

In the above php example, the finally printed two-dimensional code is shown in FIG. 3. As it is scanned by an application including a code-scan function, such as WeChat or 360 Security Guard, a recovered URL "Welcome to the Wilson of the House" can be obtained. For a two-dimensional code corresponding with a URL link, one may enter the corresponding page of the link by scanning the two-dimensional code.

During the printing process the print content may be encrypted. Since some ordinary key exchange approaches are not reliable and may confront difficulty in their set-ups, the present invention proposes to query the developer by maintenance staff of the cloud print server about the key and then burn the key into the ROM of the printing box. For the developer, there is not required any set-up for the printing box. The burning may be carried out remotely, which greatly improves convenience. When developing the application, the developer may communicate with API depending on the key, and the printing box may comprise a decryption unit (not shown) for decrypting the encrypted content based on the key.

A php example in which a text and a two-dimensional code are printed simultaneously is given as follows.

```
<?php
$key= "DDAC47";
$array['type'] = "twin";
$array['qr_content'] = "http://www.feado.com/"; // encoding utf8
$array['content'] = "test from beijing zhanglantianxia ding sitao"; // content encoding utf8
$now = time( );
$array['createtime'] = $now ;
$si= EncyptUrl($array , $key);
$site = "http://abc002.unifw.com";
$array['content'] = urlencode($array['content']);
$url = "$site/service/sendPrintDataCombo.php?content={$array['content']}&type=twin&qr_content=" . urlencode($array['qr_content']) . "&key=$si&createtime=$now";
$debug = 1;
if ($debug) echo "$url \n";
$content = file_get_contents($url);
if ($debug) echo "STEP 2 \n";
print_r ($content);
if ($debug) echo "STEP 3 \n";
function EncyptUrl($data , $key) {
        ksort($data, SORT_STRING);
        $_av = array_values($data);
        $src_string = implode(",", $_av) . $key;
    echo "[user: $src_string ]";
        $md5 = md5($src_string);
        return $md5;
}
?>
```

Although the present invention is described in conjunction with the example of a printing box, it should be understood that the principle of the present invention is also applicable to a printing device with a cloud printing function.

FIG. 4 illustrates a flow chart of a printing method executed by a cloud print server according to one embodiment of the present invention.

The cloud print server receives a print request from the computing device at step S410, and adds a print task entry in the print task list of the requested printing device at step S420, the print task entry comprising a print task ID and print task content. At step S430, the cloud print server determines whether an indicator exists in the print request indicative of the print content comprising a two-dimensional code. If so, the URL intended to be converted to a two-dimensional code is encoded into a two-dimensional code bit stream and stored as part of the print task at step S440. If not, it skips step S440. At step S450, the cloud print server receives from the printing device a request to download at least one new print task, the at least one new print task corresponding to at least one print task ID subsequent to the current print task ID maintained in the printing device. At step S460, the cloud print server sends the requested print task to the printing device.

FIG. 5 illustrates a flow chart of a printing method executed by a printing device according to one embodiment of the present invention.

At step S510, the printing device establishes a connection with the cloud print server. The printing device registers itself at the cloud print server at step S520. At step S530, the printing device receives the latest print task ID in the print task list from the cloud print server. At step S540, the printing device compares the latest print task ID with the current print task ID maintained in the printing device. If the two print task IDs are inconsistent, it requests to download at least one new print task from the cloud print server at step S550, the at least one new print task corresponding to at least one print task ID subsequent to the current print task ID maintained in the printing device. The printing device downloads the at least one new print task at step S560. If the two print task IDs are consistent, it returns to step S530. At step S570, the printing device determines whether an indicator exists in the print task indicative of the print content comprising a two-dimensional code. If the indicator indicative of the print content comprising a two-dimensional code exists, the printing device decodes the two-dimensional code bit stream in the print task content into a two-dimensional code at step S580, and prints the decoded two-dimensional code as an image together with other content in the print task at step S590.

It is to be understood that in order to make the disclosure concise and one or more of the inventive aspects understood, individual features of the present invention are sometimes grouped together into a single embodiment, drawing or description thereof in the above description of the exemplary embodiments of the present invention. However, the disclosed method should not be construed to reflect an intention that the claimed present invention claims more features than those explicitly stated in each claim. More specifically, as reflected in the claims below, the inventive aspect contains less than all features of an individual embodiment disclosed above. Thus, the claims abiding by the detailed description are hereby explicitly incorporated into the specific embodiments, wherein each claim per se serves as a single embodiment of the present invention.

Those skilled in the art should understand that the modules or units or components of the devices in the examples disclosed herein can be arranged in a device as described in the embodiment, or can alternatively be positioned in one or more devices different than the exemplary device. The modules in the aforementioned examples can be combined into one module or beyond this divided into a plurality of sub-modules.

Those skilled in the art can understand that the modules in the devices of the embodiments can be modified adaptively and arranged in one or more devices different than the embodiment. The modules or units or components in the embodiments can be combined into one module or unit or component, and they can be further divided into a plurality of sub-modules or sub-units or sub-components. Any combination of the features and/or process or units can be used to combine all features disclosed in this specification (including the accompanying claims, abstract and drawings) and any method or all processes or units of the devices as such disclosed, except that at least some of such features and/or processes and/or units are repulsive to each other. Unless specified otherwise, each feature disclosed in the present specification (including the accompanying claims, abstract and drawings) can be substituted by a substitutive feature that provides an identical, equivalent or similar goal.

In addition, those skilled in the art can understand that although some embodiments mentioned herein comprise certain features comprised in other embodiments instead of other features, the combination of features from different embodiments implies that they fall within the scope of the present invention and form different embodiments. For example, in the following claims, any one of the claimed embodiments can be used in arbitrary combinations.

In addition, some of the embodiments herein are described as a combination of the methods or method elements implemented by a processor of a computer system or by other devices executing said functions. Therefore, a processor having instructions necessary for implementing the methods or method elements forms a device for implementing the methods or method elements. Moreover, the elements of the device embodiments mentioned herein are examples of devices that are used to implement the functions executed by the elements for implementing the goal of the invention.

As is used herein, unless specified otherwise, the description of an ordinary object with ordinal numbers "first", "second", "third" and the like only represents that different instances of similar objects are involved, and is not intended to imply that the objects as such described must have any given orders temporally, spatially, sequentially or in any other manner.

Although the present invention is described in dependence on a limited number of embodiments, owing to the above description, one skilled in the art is aware that other embodiments can be envisaged within the scope of the present invention described herein. In addition, it should be noted that the language used in the present specification is selected for the purpose of readability and teaching, rather than for explaining or defining the subject matter of the invention. Therefore, if not deviating from the scope and spirit of the attached claims, many modifications and changes are clear for those of ordinary skills in the art. For the scope of the present invention, the disclosure of the invention is illustrative, not restrictive, and the scope of the invention is defined by the appended claims.

The invention claimed is:

1. A network print server, comprising:
a print task memory configured to store a print task list;
a printing device registration unit configured to establish, in response to a request of a printing device, a network connection with the printing device, register the printing device and create in the print task memory a print task list corresponding to the printing device; and
a print task management unit configured to receive a print request from a computing device and add a print task entry in the print task list of the requested printing device, the print task entry comprising a print task ID and print task content; and
a two-dimensional code encoding unit,
wherein the print task management unit is further configured to determine whether an indicator exists in the print request indicative of the print content comprising a two-dimensional code, and if so, the two-dimensional code encoding unit is configured to encode a URL intended to be converted to a two-dimensional code into a two-dimensional code bit stream and store it as part of the print task.

2. The network print server according to claim 1, wherein the print task management unit is further configured to receive from the printing device a request to download at least one new print task and send the at least one new print task to the printing device, the at least one new print task corresponding to at least one print task ID subsequent to the current print task ID maintained in the printing device.

3. The network print server according to claim 1, wherein the print task content is encrypted by a key.

4. The network print server according to claim 1, wherein the URL is provided by the computing device or pre-stored in the network print server.

5. A network printing system, comprising a network print server and at least one network printing device,
  wherein the network print server comprises:
    a print task memory configured to store a print task list;
    a printing device registration unit configured to establish, in response to a request of the printing device, a network connection with the printing device, register the printing device and create in the print task memory a print task list corresponding to the printing device; and
    a print task management unit configured to receive a print request from a computing device and add a print task entry in the print task list of the requested printing device, the print task entry comprising a print task ID and print task content; and
    a two-dimensional code encoding unit,
    wherein the print task management unit is further configured to determine whether an indicator exists in the print request indicative of the print content comprising a two-dimensional code, and if so, the two-dimensional code encoding unit is configured to encode a URL intended to be converted to a two-dimensional code into a two-dimensional code bit stream and store it as part of the print task,
  wherein the network printing device comprises:
    a network initialization unit configured to establish the network connection between the printing device and the network print server and register the printing device at the network print server;
    a print task management unit configured to compare the latest print task ID of the printing device provided by the network print server with the current print task ID maintained in the printing device, and request and download at least one new print task from the network print server if the two print task IDs are inconsistent, the at least one new print task corresponding to at least one print task ID subsequent to the current print task ID maintained in the printing device; and
    a two-dimensional code decoding unit,
    wherein the print task management unit is further configured to determine whether an indicator exists in the print task indicative of the print content comprising a two-dimensional code, and if so, the two-dimensional code decoding unit is configured to decode the two-dimensional code bit stream in the print task into a two-dimensional code.

6. The network printing system according to claim 5, wherein the network printing device further comprises a printing unit configured to execute a print task assigned by the print task management unit, wherein the decoded two-dimensional code is printed as an image together with other content in the print task.

7. The network printing system according to claim 6, wherein the network initialization unit, the print task management unit and the two-dimensional code decoding unit are located in a printing box outside of the printing unit.

8. The network printing system according to claim 5, further comprising a decryption unit for decrypting the print task content encrypted by a key.

9. A printing method of a network print server, comprising:
  receiving a print request from a computing device;
  adding a print task entry in a print task list to which a target printing device of the print request corresponds, the print task entry comprising a print task ID and print task content;
  receiving from the target printing device a request to download the print task;
  determining whether an indicator exists in the print request indicative of the print task content comprising a two-dimensional code;
  if so, encoding a URL intended to be converted to a two-dimensional code into a two-dimensional code bit stream and storing it as part of the print task.

10. The method according to claim 9, further comprising:
  receiving from the printing device a request to download at least one new print task, and sending the requested print task to the printing device, the at least one new print task corresponding to at least one print task ID subsequent to the current print task ID maintained in the printing device.

11. The method according to claim 9, the print task content is encrypted by a key.

12. The method according to claim 9, the URL is provided by the computing device or pre-stored in the network print server.

\* \* \* \* \*